Sept. 20, 1932.   A. R. BLISS, JR., ET AL   1,878,459
ANIMAL CAGE
Filed Feb. 2, 1928   2 Sheets-Sheet 1
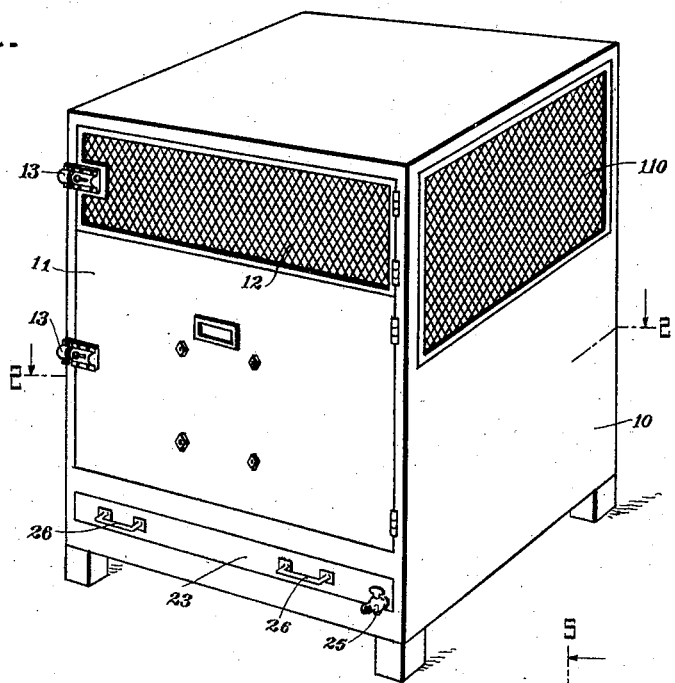
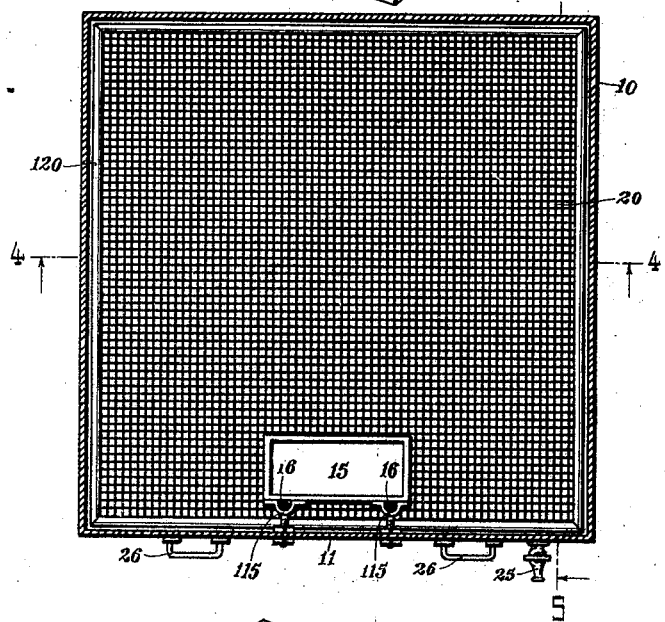
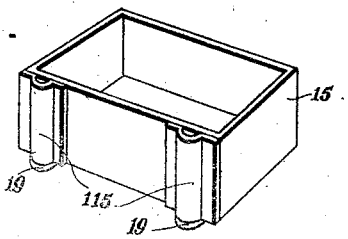
WITNESSES
INVENTORS
A. R. Bliss Jr.
BY George S. Bliss
ATTORNE

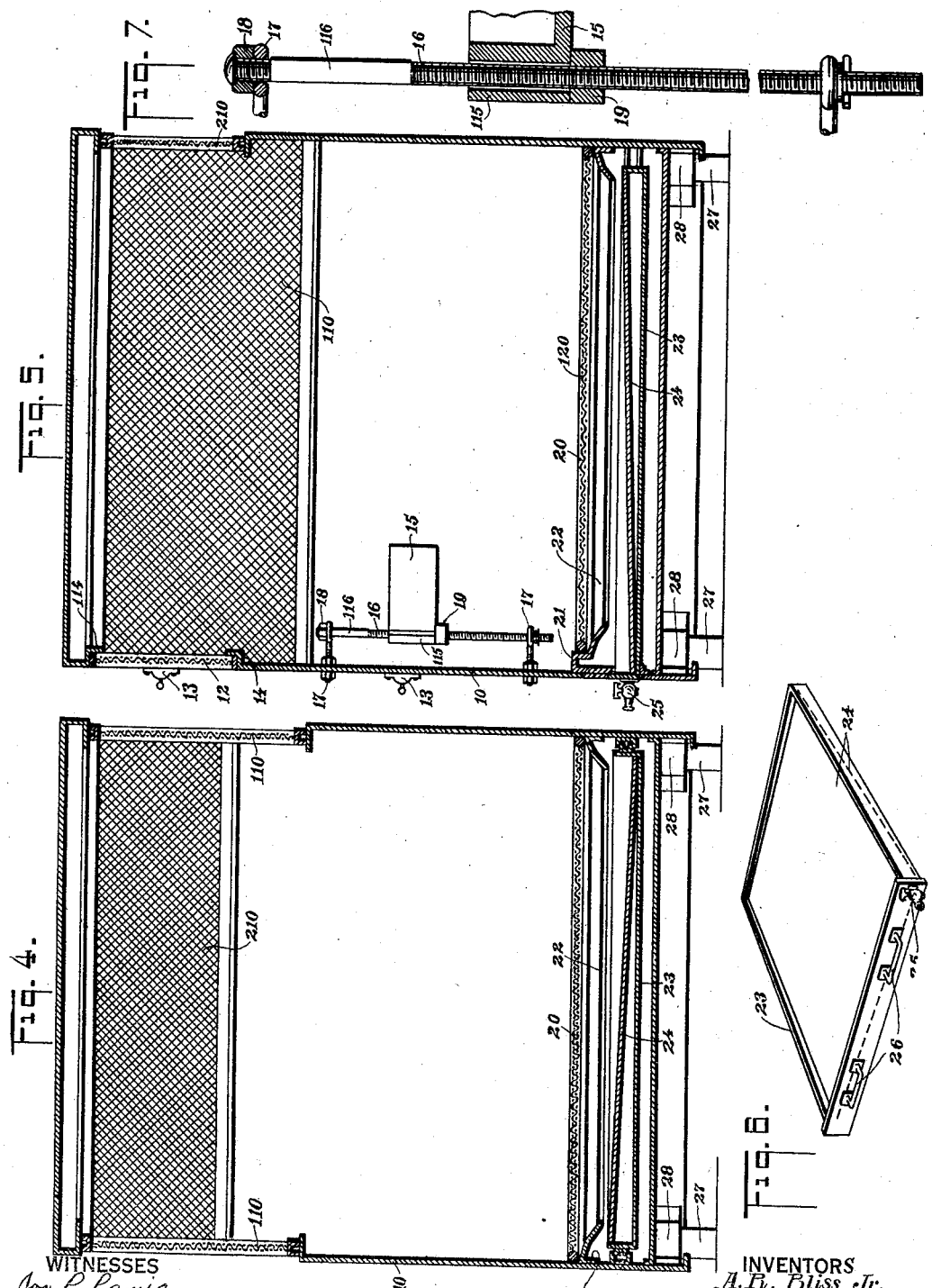

Patented Sept. 20, 1932

1,878,459

UNITED STATES PATENT OFFICE

ANDREW RICHARD BLISS, JR., OF MEMPHIS, TENNESSEE, AND GEORGE SUTTON BLISS, OF BROOKLYN, NEW YORK

ANIMAL CAGE

Application filed February 2, 1928. Serial No. 251,362.

Our invention has reference to a water holder for an animal cage and to supporting means for the water holder.

Reference is to be had to the accompanying drawings forming part of this specification, it being understood that the drawings are merely illustrative of one example of the invention.

Figure 1 is a perspective view of an animal cage embodying our invention;

Figure 2 is a horizontal section taken in a plane indicated by the lines 2—2 of Figure 1;

Figure 3 is a perspective view of a water holder;

Figure 4 is a vertical section on the line 4—4 of Figure 2;

Figure 5 is a transverse vertical section on the line 5—5 of Figure 2;

Figure 6 is a perspective view of the drawer for holding the urinal discharges of the animal; and Figure 7 is a sectional view showing certain details of the water tray or holder adjusting means, a portion of the tray or holder being shown.

In carrying out our invention in accordance with the illustrated example, the body of the cage 10 is given a general box-like form and has at the upper portion side panels 110 of wire mesh or other openwork and rear panels 210 also of wire mesh or other openwork.

At the front is a duplex door, there being a sheet metal door 11 and a wire mesh door 12, said doors having each a suitable fastening means 13 at the sides. The sheet metal door 11 has an angular upper edge 14 offset laterally inward against which the wire mesh door 12 closes at the bottom edge, the upper edge of the door closing against the angular upper edge at the top of the cage body 10.

A water holder 15 is carried by the door 11 at the inside. Said water holder 15 is formed with tubular vertical guides 115 which are sleeved on threaded rods 16 held by eye-bolts 17, the upper end of each rod 16 having a collar 18 beneath the head of the bolt 16 to rest on the upper eye-bolt 17. A nut 19 is rigid with the water tray or holder 15 and is threaded on to the rod 16. Said rod 16 has a squared or non-circular portion 116 to promote convenience in turning the rod so that the threaded engagement of the same with the nut 19 will cause the nut to travel up or down on said rod and thereby raise or lower the water holder 15 to a height suited to the size of the particular animal under observation in the cage and without liability of the water being contaminated by the animal.

A false bottom or floor 20 for the animal's support is provided and formed preferably of wire mesh or equivalent openwork material so that the urinal discharges from the animal will freely pass therethrough. The false bottom 20 rests on a ledge 21 on the body 10 preferably at four sides of the said false bottom which latter has a rod or wire frame 120. The ledge 21 has a flange 22 directed laterally inward and downward to deflect the liquid passing through the false bottom 20 away from the sides of the cage body 10. A pan 23 in the form of a removable drawer has a top 24 sloping in all directions toward one corner which corner is provided with a drain or draw-off cock 25.

Liquid discharges from the animal on the false bottom 20 will pass through said false bottom and be deflected by the flange 22 to the top 24 of pan 23 and will flow toward the corner of said pan 23 having the drain cock 25.

The numeral 26 indicates handles on the drawer or pan 23. The numeral 27 indicates short legs provided on the body 10 and removably fitting in sockets 28 on the bottom of said cage body 10. The removal of the legs 27 permits of the cages being stacked firmly one upon another without danger of one sliding from the other.

It will be clear from the foregoing description and the drawings that the cage permits of being easily and completely cleaned. It is most easily sterilized without damage to the material of the cage since it is made entirely of metal which will withstand both thorough cleansing, disinfecting solutions, hot or boiling water, and steam sterilization.

Furthermore, the water holder or tray 15, as will be seen, is readily adjustable to place its contents within comfortable reach of the animal, yet the tray cannot be tipped or turned over. This last mentioned feature is invaluable since the spilling of the contents of the tray into the cage would materially alter results and thus prevent accuracy of investigation and observation. Again, the fact that the tray is adjustable makes it possible to prevent the discharge of urine into the same. Scientific investigations for which the cage is employed demand absolute accuracy and the complete collection of the urine without contamination, dilution or loss. The wire mesh floor or false bottom 20, the supporting ledge thereof, and the hopper drawer are so constructed and arranged in connection with the solid metal portion of the door 11 in the side and back that all of the urine voided by the animal is caused to flow into and be collected by the hopper drawer 23 because of the inclined tray surface from which it can be drawn off completely and subjected to scientific investigations. In scientific investigations of the type for which the cage is useful, the solid matter voided by the animal is kept solid because of the diet, and the possible contamination of the urine by such matter is prevented.

We would state furthermore that while the illustrated example constitutes a practical embodiment of our invention, we do not limit ourselves strictly to the exact details herein illustrated, since, manifestly, the same can be considerably varied without departure from the spirit of the invention as defined in the appended claims.

We claim:

1. In an animal cage, a door, a vertical rod on the door, coacting means on the door and rod supporting said rod for turning movement but preventing axial movement thereof, and a receptacle carried by said rod and vertically adjustable thereon by turning said rod.

2. In an animal cage, a water holder, a vertical rod having a threaded portion, means connected with the upper and lower ends of the rod turnably supporting the rod and preventing axial movement thereof, and a nut rigid with the water holder and in engagement with the threads of said rod, the turning of the rod serving to cause the nut to travel for raising or lowering the water holder.

ANDREW RICHARD BLISS, Jr.
GEORGE SUTTON BLISS.